United States Patent Office 2,779,045
Patented Jan. 29, 1957

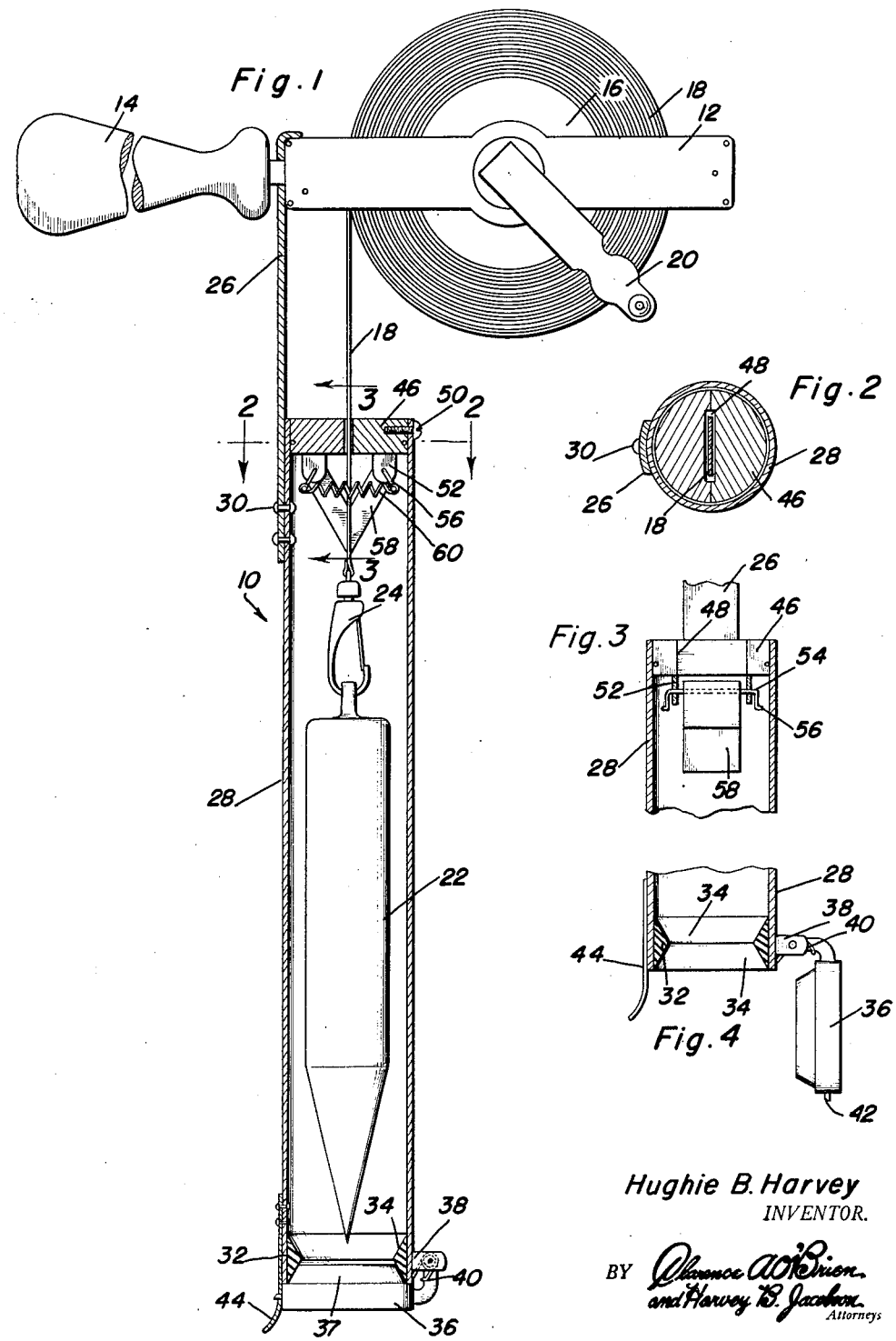
Jan. 29, 1957 — H. B. HARVEY — 2,779,045
GAUGE LINE WIPER AND PLUMB BOB CASE
Filed June 24, 1954
Hughie B. Harvey
INVENTOR.

2,779,045

GAUGE LINE WIPER AND PLUMB BOB CASE

Hughie B. Harvey, County Line, Okla.

Application June 24, 1954, Serial No. 438,958

2 Claims. (Cl. 15—256.5)

This invention relates to a gauge line wiper and plumb bob case and more specifically provides an attachment for a gauge line having a reel with a suitable frames and handle for the frame together with a handle for winding the reel and a plumb bob mounted on the free end of the gauge line wherein the plumb bob may be lowered into tanks of liquid such as crude oil, or the like, thereby measuring the depth of the liquid in the tanks and the quantity of liquid in the tanks.

An object of this invention is to provide an attachment for gauge lines as described in the above paragraph, which forms a housing or case for the plumb bob and also provides means for wiping off the excess oil on the gauge line when it is wound upon the reel as the plumb bob is raised out of the liquid tank.

A further object of this invention is to provide an attachment for a gauge line constructed of a steel measuring line for measuring the quantity of crude oil in storage tanks wherein the attachment is simple in construction, easy to use, well adapted for its purposes, and inexpensive to manufacture.

Still another important object of this invention is to provide an attachment for gauge lines wherein the operation of the gauge line will be facilitated and the oil measuring operation may be carried out in a relatively clean manner thereby reducing the oil carried onto the reel by winding of the steel measuring tape back onto the reel after it has been inserted in a crude oil storage tank.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a longitudinal, vertical section view taken substantially along a plane passing through the longitudinal center line of the construction of the present invention;

Figure 2 is a top plan sectional view taken substantially along section line 2—2 of Figure 1 showing the details of construction of the top of the tubular member and the relationship of the slot therein to the steel measuring tape;

Figure 3 is a detailed, vertical sectional view taken substantially along section line 3—3 of Figure 1 showing the details of construction of one of the wiping elements; and Figure 4 is an enlarged fragmental view showing the bottom portion of Figure 1 and the details of construction of the pivotal closure and the guide rib for directing the entry and exit of the plumb bob from the plumb bob case.

Referring now specifically to the drawings, it will be seen that the gauge line wiper and plumb bob case of the present invention is generally indicated by the numeral 10 and is attached to a frame member 12 having a handle 14 at its rear end and a reel 16 positioned thereon for winding a steel tape gauge line 18 thereon. A suitable handle 20 is provided for winding the reel 16 and a plumb bob 22 is secured to the free end of the gauge line 18 with a suitable snap hook 24 that is pivotally connected to the end of the gauge line 18 in any suitable manner.

The attachment of the present invention includes a depending vertically disposed bracket 26 that is secured to the rear portion of the frame 12 by positioning over the handle mounting means in a suitable manner. A vertically disposed and relatively elongated tubular member 28 is secured to the bottom portion of the depending bracket 26 by suitable rivets 30 thereby rigidly securing the tubular member 28 in relation to the frame 12. The lower end of the tubular member 28 is providtd with an internal rib 32 which is upwardly and downwardly beveled as indicated by the numeral 34 for guiding movement of the plumb bob 22 within the tubular casing 28. A closure 36 is pivotally secured to a pair of lugs 38 adjacent the bottom of the tubular member 28 and a torsion spring 40 urges the closure member 36 to an open position. One side of the closure member 36 is provided with a projecting pin 42 for engagement by a spring latch 44 secured to the bottom of the tube 28. The upper end of the tube 28 is closed by a top member 46 which is constructed of two pieces and provided with a slot 48 centrally thereof for slidably receiving the steel tape 18. The top 46 is secured in the tubular member 28 by a suitable screw 50 and two pairs of spaced lugs 52 are provided on the undersurface of the top 46. As specifically shown in Figure 3, a transverse pin 54 is provided wtih arcuate end portions 56 and the pin 54 extends through the lugs 52 for pivotally receiving a wiping member 58. The pin 54 is rigidly secured to the wiping member 58 and a tension coil spring 60 is positioned between the end portions 56 of the pin 54 wherein the pivotal wiping member 58 will be continuously urged toward each other. It will be seen that the wiping members 58 both depend from the lugs 52 and are provided with wiping faces which are in angular relation to the rest of the wiping members 58 in order to engage the surfaces of the gauge line 18. The width of the wiping faces of the wiping members 58 is substantially the same as the width of the gauge line 18 thereby wiping the entire surface of the gauge line 18. Also, due to the downward convergence of the members 58, the wiping faces of the wiping members 58 will closely engage the gauge line 18 as the gauge line 18 is wound about the reel 16 thereby raising the plumb bob 22 out of a liquid tank. It will be seen that the generally pointed ends of the wiping members 58 will efficiently remove substantially all of the crude oil or other liquid from the gauge line 18 thereby eliminating the necessity of cleaning the gauge line 18 with suitable waste rags or the like.

The operation of the device will be readily understood, By releasing the spring latch 44, the spring 40 will urge the closure 36 with the inwardly tapering portion 37 to its open position substantially as shown in Figure 4 wherein the handle 14 may be held in one hand while the reel 16 is turned counter-clockwise by manipulation of the handle 20 thereby lowering the plumb bob 22 downwardly into the liquid tank such as a crude oil storage tank for determining the depth or quantity of crude oil in the tank. After the plumb bob 22 has been lowered to the bottom of the tank, the handle 20 on the reel 16 is turned clockwise thereby winding the gauge line 18 back on the reel 16. The gauge line 18 may be observed for noting the oil line for determining the depth of oil in the tank and as the gauge line 18 is wound about the reel 16, the wiping members 58 urged together by the tension spring 60 engage the surfaces of the gauge line 18 thereby wiping the surfaces dry of oil wherein the oil will drip back into the tank and the usual cleaning of the gauge line 18 by waste rags, or the like, is eliminated. The flared portion 34 of the internal rib 32 forms a guide for positioning the plumb bob 22 within the tubular member 28 and also provides a seat for the closure 36 thereby forming a seal for the lower end of the tubular member 28. Also, it will be seen that the internal rib 32 may be constructed of suitable rubber or other resilient material thereby guiding the gauge line 18 toward the slot 48 for easy sliding movement therein. Further, the wiping members 58 will engage the gauge line 18 in a more direct manner when the gauge line 18 is guided by the internal rib 32. It will be understood that the device of the present invention will save much time and eliminate the cost of the waste rags and the carrying of the waste rags for the usual cleaning operation. The device may be constructed of any readily obtainable material and may be produced so that the sale price will remain relatively low thereby enhancing the economic feasibility of the device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A combined gauge line wiper and plumb bob case attachment for mounting on a reel frame with the reel frame having a carrying handle, a reel, a gauge line attached to the reel and a plumb bob on the free end of the gauge line, said attachment comprising a supporting bracket adapted to be mounted on the frame in depending relation and adjacent the carrying handle, a vertically disposed tubular member mounted on the lower end of the bracket in substantially tangential relation to the reel with the gauge line wound thereon, a top closure member mounted in the upper end of the tubular member, said top closure member being rigid with the tubular member and provided with a slot for slidably receiving the gauge line, a pivotal closure member at the lower end of said tubular member, an inwardly extending peripheral rib mounted in the lower end of said tubular member, said rib having inclined upper and lower surfaces for guiding movement of the plumb bob into and out of the tubular member, and means mounted on the undersurface of the top closure member for wiping the gauge line as it is wound upon the reel, said means including a pair of wiping members pivotally attached to the top closure member, said wiping members extending downwardly in converging relation with the end surface being in oblique angular relation to the longitudinal axis thereof thus providing flat surfaces for engagement with opposite surfaces of the gauge line, spring means for urging the free ends of the wiping members into contact with the gauge line, said rib at the bottom of the tubular member acting as a guide for the gauge line as it is pulled between the wiping members and as a seat for said pivotal closure thus preventing leakage from the bottom of the tubular member.

2. A wiping attachment for a reel type measuring instrument having a gauge line comprising a slotted guide member for receiving the gauge line, bracket means for mounting the guide member in spaced relation to the measuring instrument, a pair of depending pivotal wiping members mounted on said guide member on opposite sides of the slot therein, each of said wiping members having an inclined end surface for engagement with the surface of the gauge line, tension spring interconnecting said wiping members for urging the same towards each other for centering the gauge line in relation to the slot and wiping the gauge line, a tubular member extending downwardly from the slotted guide member for guiding the gauge line between the wiping members and generally guiding downwardly the excess liquid wiped from the gauge line.

References Cited in the file of this patent
UNITED STATES PATENTS

| | | |
|---|---|---|
| 1,968,919 | Wanee | Aug. 7, 1934 |
| 2,035,379 | Stewart | Mar. 24, 1936 |
| 2,099,153 | Walker | Nov. 16, 1937 |